United States Patent [19]

Kuwabara et al.

[11] Patent Number: 4,657,937

[45] Date of Patent: Apr. 14, 1987

[54] ENERGY ABSORBER

[75] Inventors: Hideki Kuwabara, Hadano; Masato Naito, Hiratsuka, both of Japan

[73] Assignee: Japan Styrene Paper Corporation, Tokyo, Japan

[21] Appl. No.: 824,269

[22] Filed: Jan. 30, 1986

[30] Foreign Application Priority Data

Feb. 4, 1985 [JP] Japan ................................ 60-19659

[51] Int. Cl.⁴ .......................... C08J 9/18; C08J 9/22; C08J 9/24; B32B 3/26
[52] U.S. Cl. ...................................... 521/56; 428/357; 428/402; 521/58; 521/59; 521/60; 521/139
[58] Field of Search ....................... 521/58, 59, 60, 56, 521/57, 139; 428/357, 402

[56] References Cited

U.S. PATENT DOCUMENTS

| | | | |
|---|---|---|---|
| 4,168,353 | 9/1979 | Kitamori | 521/59 |
| 4,399,087 | 8/1983 | Akiyama et al. | 521/60 |
| 4,443,393 | 4/1984 | Akiyama et al. | 521/58 |
| 4,464,484 | 8/1984 | Yoshimura et al. | 521/58 |
| 4,504,534 | 3/1985 | Adachi et al. | 521/58 |
| 4,525,486 | 6/1985 | Kobayashi et al. | 521/56 |
| 4,600,636 | 7/1986 | Yoshimura et al. | 428/304.4 |

*Primary Examiner*—William J. Van Balen
*Attorney, Agent, or Firm*—Sherman and Shalloway

[57] ABSTRACT

An energy absorber suitable for use as a bumper core or the like is formed of an expansion-molded article of prefoamed particles. The prefoamed particles use, as the base resin thereof, a resin obtained by impregnating high-density polyethylene with an aromatic vinyl monomer and polymerizing the monomer. The absorber has a density ($\rho$) of 0.015–0.15 g/cm³ and satisfies the following relation:

$$E_{20}/\rho \geq 45 \text{ kg·cm/g}$$

wherein $E_{20}$ (kg·cm/cm³) means the quantity of energy absorbed upon 70% compression at 20° C. and $\rho$ has the same meaning as defined above.

5 Claims, 1 Drawing Figure

F I G. 1
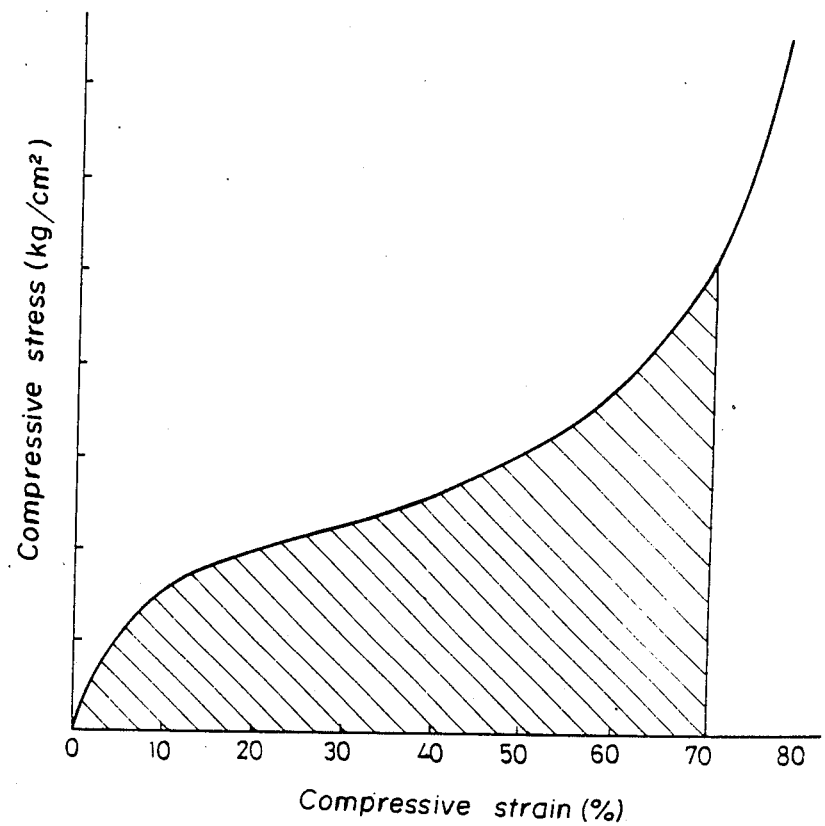

ENERGY ABSORBER

This invention relates to an energy absorber, and specifically to an energy absorber formed of an expansion-molded article of prefoamed particles.

As energy absorbers such as cores for helmets, cores for gymnastic mats, corner pads and cores for automobile bumpers, there have conventionally been employed those formed of polyurethane foam, polystyrene foam and expansion-molded articles of prefoamed polypropylene-base particles.

As properties required for energy absorbers, there may be mentioned not only good energy absorbing performance but also excellent impact resistance and high lightweight property.

Since polyurethane foam which has been referred to above as a conventional energy absorber has a small energy absorption rate per unit weight, it is accompanied by such drawbacks that it cannot achieve the weight reduction to any sufficient extent and its use results in a costly energy absorber. Polystyrene foam is also accompanied by such shortcomings that it is inferior in oil resistance, heat resistance and impact resistance.

On the other hand, expansion-molded articles of prefoamed propylene-base particles have light weights and superb oil resistance, heat resistance and energy absorbing property. They however tended to develop dimensional distortion subsequent to their molding. When molded as energy absorbers which require especially high dimensional accuracy, such as bumper cores and the like, it was necessary to mold the core in two separate pieces and upon fitting them within a covering, to adjust their dimensions, for example, by cutting proximal end portions of the separate pieces. Furthermore, it took a long time to age the cores until their dimensions were stabilized. Such expansion-molded articles of prefoamed propylene-base particles were thus accompanied by such a problem that the production process of a bumper or bumper core was complex. There is still some room for improvement.

With the foregoing in view, the present invention has as its object the provision of an energy absorber having excellent energy absorbing performance and impact resistance, permitting weight reduction with ease and enjoying good dimensional accuracy.

The present inventor has carried out an extensive research with a view toward solving the above-mentioned problems and drawbacks. As a result, it has been found that they can be solved by an energy absorber formed of an expansion-molded article of prefoamed particles, which employ a specific resin as its base resin, and satisfying the following relation:

$$E_{20}/\rho \geq 45 \text{ kg·cm/g}$$

wherein $\rho$ stands for the density of the expansion-molded article and $E_{20}$ (kg·cm/cm$^3$) means the quantity of energy absorbed in the expansion-molded article upon 70% compression at 20° C., leading to completion of this invention.

In one aspect of this invention, there is thus provided an energy absorber comprising an expansion-molded article of prefoamed particles which use, as the base resin thereof, a resin obtained by impregnating high-density polyethylene with an aromatic vinyl monomer and polymerizing the monomer, said absorber having a density ($\rho$) of 0.015–0.15 g/cm$^3$ and satisfying the following relation:

$$E_{20}/\rho \geq 45 \text{ kg·cm/g}$$

wherein $E_{20}$ (kg·cm/cm$^3$) means the quantity of energy absorbed upon 70% compression at 20° C. and $\rho$ has the same meaning as defined above.

The energy absorber of this invention is excellent in energy absorbing efficiency, impact resistance and heat resistance, is lightweight, and exhibits superb shock-absorbing properties. Furthermore, the prefoamed particles which use, as the base resin thereof, the resin obtained by causing the aromatic vinyl monomer to be absorbed and polymerized in high-density polyethylene facilitates the production of the energy absorber of this invention owing to their excellent moldability. The energy absorber of this invention obtained by expansion-molding the prefoamed particles is excellent in dimensional stability. When the energy absorber of this invention is produced as a bumper core, it is unnecessary to go through with such a cumbersome step that the dimensions of the core must be adjusted in relation to its matching covering. Therefore, the process for the production of a bumper can be simplified.

The above and other objects, features and advantages of the present invention will become apparent from the following description and the appended claims, taken in conjuction with the accompanying sole drawing, in which:

FIG. 1 shows compressive stress as a function of compressive strain, specifically, the quantity of energy absorbed upon 70% compression.

In the present invention, the base resin may, for example, be composed of a graft polymer of polyethylene, the density of which is 0.94–0.97 g/cm$^3$ or preferably 0.955–0.97 g/cm$^3$, and an aromatic vinyl monomer. For example, the aromatic vinyl monomer with a polymerization initiator added therewith is incorporated in an aqueous suspension of polyethylene pellets, the temperature of the suspension is controlled at a predetermined level, so that the impregnation of the aromatic vinyl monomer into the pellets and its polymerization in the pellets are effected simultaneously.

As aromatic vinyl monomers useful upon preparing the base resin, there may be mentioned styrene, α-methylstyrene, para-methylstyrene, ethylstyrene, halogenated styrenes, and mixtures of 50 wt. % or more of these monomers and other monomers copolymerizable with the aromatic vinyl monomers. Prefoamed particles useful in the practice of this invention may, for example, be prepared in the following manner. A resin, which has been obtained by impregnating an aromatic vinyl monomer in high-density polyethylene and polymerizing the monomer in the polyethylene, and a foaming agent are dispersed in a dispersant in a closed vessel. Thereafter, the contents are heated to have the modified resin particles impregnated with the foaming agent. The vessel is then opened at one end thereof, thereby releasing the modified resin particles and dispersant into the surrounding atmosphere of a lower pressure and foaming the modified resin particles.

In the present invention, the content of the aromatic vinyl monomer in the expansion-molded article may preferably be within a range of 10–60 wt. %. Any contents lower than 10 wt. % will not lead to any substantial increase to the stiffness. Any contents in excess of 60 wt. % will impair certain properties of polyethylene such as heat resistance.

In the present invention, the resin which has been obtained by impregnating high-density polyethylene with the aromatic vinyl monomer and polymerizing the monomer may be in either crosslinked or uncrosslinked form. When crosslinked, the gel content determined from the content of matter insoluble in boiling xylene is desirously 60 wt. % or smaller. Regarding the crosslinking of the above-mentioned modified resin, the crosslinking may be achieved as early as the stage of the resin particles employed for the production of the prefoamed particles. Alternatively, after producing the prefoamed particles or expansion-molding the prefoamed particles into the energy absorber, the prefoamed particles or energy absorber may be exposed to an electron beam so as to have the modified resin crosslinked.

The energy absorber of this invention has a density $\rho$ of 0.015–0.15 g cm$^3$ or preferably 0.02–0.1 g/cm$^3$. If the density $\rho$ should be smaller than 0.015 g/cm$^3$, it will be impossible to provide an energy absorber with reduced dimensions. Any densities greater than 0.15 g/cm$^3$ will however led to an increased weight, thereby failing to provide an energy absorber with a reduced weight.

The energy absorber of this invention satisfies the following relation:

$$E_{20}/\rho \geq 45 \text{ kg·cm/g}$$

wherein $E_{20}$ (kg·cm/cm$^3$) means the quantity of energy absorbed upon 70% compression at 20° C. and $\rho$ has the same meaning as defined above. It is light in weight and excellent in impact resistance.

Namely, so long as the above relation $E_{20}/\rho \geq 45$ kg·cm/g is met, it is possible to form an energy absorber with still smaller dimensions without lowering its impact resistance.

As depicted in FIG. 1, the quantity of energy absorbed in the energy absorber upon 70% compression at 20° C., $E_{20}$ (kg·cm/cm$^3$) is determined as the area up to a point where the compressive strain reaches 70% on a compressive strain vs. compressive stress curve at 20° C. of the energy absorber (i.e., the hatched area in FIG. 1).

In order to have the energy absorber satisfy the above-described relation $E_{20}/\rho \geq 45$ kg·cm/g wherein $E_{20}$ (kg·cm/cm$^3$) means the quantity of energy absorbed upon 70% compression at 20° C. and $\rho$ has the same meaning as defined above, it is preferable to use, as the prefoamed particles made of the resin of high-density polyethylene impregnated with the aromatic vinyl monomer and polymerized the monomer and to be employed for the production of the energy absorber, those having shapes similar to spheres and a closed cell content of 90% or higher and containing air in the their cells. The preferable particle size of the prefoamed particles may range from 2 mm to 15 mm whereas the preferable cell diameter may range from 0.10 mm to 2.00 mm. Any particle sizes smaller than 2 mm will result in energy absorbers having inferior dimensional accuracy when such prefoamed particles are expansion-molded. If the particle size should exceed 15 mm, the resulting energy absorber will be accompanied with poor melt-bonding and as a result, its surface smoothness will be poor.

The energy absorber of this invention can be produced, for example, by using the prefoamed particles, which employs as its base resin the resin obtained by impregnating the high-density polyethylene with the aromatic monomer and polymerizing the monomer, as they are or if necessary, subjecting the prefoamed particles to a pressurizing treatment by means of an inorganic gas such as air, oxygen, nitrogen or carbon dioxide or a mixed gas of such an inorganic gas and a volatile foaming agent such as hexane, heptane, dichlorodifluoromethane or trichlorotrifluoroethane to impart an internal pressure to the prefoamed particles, filling the former or latter prefoamed particles in a metal mold suitable for use in molding an energy absorber of desired configurations, heating the prefoamed particles with steam of 3–5 kg cm$^2$(G) or so whereby the prefoamed particles are expanded and are hence mutually melt-bonded.

The present invention will hereinafter be described in further detail by the following Examples and Comparative Examples.

EXAMPLES AND COMPARATIVE EXAMPLES

Prefoamed particle samples, which are given in the Table 1 and containing their corresponding resins shown in Table 1 as their base resins, were individually filled in a metal mold suitable for use in the production of energy absorbers and heated with steam to cause them to expand, thereby obtaining energy absorbers the configurations of which were in conformity with the metal mold. The densities $\rho$ of those energy absorbers, quantities $E_{20}$ of energy absorbed therein upon 70% compression at 20° C. and the values $E_{20}/\rho$ are given in Table 2. Various properties of those energy absorbers were also measured. Measurement results are also shown in Table 2.

As Referential Example 1, an energy absorber was obtained by expansion-molding prefoamed polypropylene particles in the same manner as in the Examples and Comparative Examples. Besides, as Referential Example 2, there was also provided a commercial energy absorber formed of an expansion-molded article of prefoamed particles which was made of a resin obtained by impregnating low-density polyethylene with a styrene monomer and polymerizing the monomer. Various properties of those energy absorbers were also measured. Measurement results are also shown in Table 2.

TABLE 1

| | | Base resin | | | Prefoamed particles | | |
|---|---|---|---|---|---|---|---|
| | Kind | Content of[1] aromatic vinyl polymer (%) | Degree of[2] grafting (%) | Gel[3] content (%) | Average particle size (mm) | Average cell size (mm) | Apparent density (g/cm$^3$) |
| Example 1 | Resin obtained by impregnating high-density polyethylene with styrene monomer and polymerizing the monomer | 15 | 14 | 38 | 2.5 | 0.11 | 0.14 |
| 2 | Resin obtained by impregnating high- | 25 | 30 | 35 | 5.1 | 0.35 | 0.10 |

TABLE 1-continued

|  |  |  | Base resin | | | Prefoamed particles | | |
| --- | --- | --- | --- | --- | --- | --- | --- | --- |
|  |  | Kind | Content of(1) aromatic vinyl polymer (%) | Degree of(2) grafting (%) | Gel(3) content (%) | Average particle size (mm) | Average cell size (mm) | Apparent density (g/cm³) |
|  |  | density polyethylene with styrene monomer and polymerizing the monomer |  |  |  |  |  |  |
|  | 3 | Resin obtained by impregnating high-density polyethylene with styrene monomer and polymerizing the monomer | 35 | 48 | 30 | 7.3 | 0.50 | 0.05 |
|  | 4 | Resin obtained by impregnating high-density polyethylene with para-methylstyrene monomer and polymerizing the monomer | 45 | 52 | 27 | 10.5 | 1.00 | 0.03 |
|  | 5 | Resin obtained by impregnating high-density polyethylene with para-methylstyrene monomer and polymerizing the monomer | 55 | 55 | uncross-linked | 13.0 | 1.50 | 0.016 |
| Comp. Ex. | 1 | Resin obtained by impregnating high-density polyethylene with styrene monomer and polymerizing the monomer | 40 | 23 | 30 | 2.0 | 0.11 | 0.20 |
|  | 2 | Resin obtained by impregnating high-density polyethylene with styrene monomer and polymerizing the monomer | 40 | 25 | 30 | 13.5 | 1.80 | 0.012 |
|  | 3 | Resin obtained by impregnating high-density polyethylene with styrene monomer and polymerizing the monomer | 20 | 2 | 5 | 5.5 | 0.40 | 0.03 |
| Ref. Ex. | 1 | Polypropylene | * | * | uncross-linked | 3.5 | 0.45 | 0.03 |
|  | 2 | Resin obtained by impregnating low-density polyethylene with styrene monomer and polymerizing the monomer | 40 | 30 | 30 | 3.2 | 0.40 | 0.05 |

TABLE 2

|  |  | $\rho C$. (g/cm³) | $E_{20}$ (kg·cm/cm³) | $E_{20}/\rho$ (kg·cm/g) | Heat(4) resistance | Lightweight(5) property | Impact resistance(6) | | Dimensional(7) stability | Overall evaluation |
| --- | --- | --- | --- | --- | --- | --- | --- | --- | --- | --- |
|  |  |  |  |  |  |  | 60 mm | 100 mm |  |  |
| Example | 1 | 0.14 | 6.3 | 45 | ○ | ○ | ○ | ○ | ○ | ○ |
|  | 2 | 0.10 | 5.0 | 50 | ○ | ○ | ○ | ○ | ○ | ○ |
|  | 3 | 0.05 | 2.8 | 56 | ○ | ○ | ○ | ○ | ○ | ○ |
|  | 4 | 0.03 | 1.7 | 57 | ○ | ○ | ○ | ○ | ○ | ○ |
|  | 5 | 0.016 | 1.0 | 63 | △ | ○ | △ | ○ | △ | △ |
| Comp. Ex. | 1 | 0.20 | 10.5 | 53 | ○ | × | ○ | ○ | ○ | × |
|  | 2 | 0.012 | 0.62 | 52 | △ | ○ | × | ○ | △ | × |
|  | 3 | 0.03 | 1.3 | 43 | ○ | ○ | × | ○ | △ | × |
| Ref. Ex. | 1 | 0.03 | 1.4 | 47 | ○ | ○ | × | ○ | △ | × |
|  | 2 | 0.05 | 2.1 | 42 | × | ○ | × | ○ | △ | × |

Note:
(1)The amount (wt. %) of the aromatic vinyl polymer contained in the corresponding resin which was obtained by impregnating high-density polyethylene with the aromatic vinyl monomer and polymerizing the monomer.

(2)Degree of grafting (%) = $\dfrac{\text{Content of the aromatic vinyl* monomer graft-polymerized with high-density polyethylene (g)}}{\text{Content of high-density polyethylene (g)}} \times 100$

*Graft-polymerized aromatic vinyl monomer = (Content of matter in the polymer obtained by graft-polymerizing with high-density polyethylene, said matter being insoluble in boiling 1:1 mixed solvent of acetone and benzene) − (Content of high-density polyethylene)

TABLE 2-continued $${}^{(3)}\text{Gel content (\%)} = \frac{\text{Content of matter insoluble in boiling xylene (g)}}{\text{Weight of sample (g)}} \times 100$$

[4] Each energy absorber was heated at 100° C. for 22 hours and its shrinkage factor (dimensional change) was measured. Its heat resistance was judged in accordance with the following standard.

Shrinkage factor

| | |
|---|---|
| less than 3% | O |
| 3% (inclusive) - 5% (exclusive) | Δ |
| 5% or greater | X |

[5] The weight of each sample of 60 mm thick × 40 mm wide × 40 mm long was measured. Its lightweight property was judged in accordance with the following standard.

Weight

| | |
|---|---|
| lighter than 15 g | O |
| 15 g or heavier | X |

[6] A weight of 18 kg was dropped at 40° C. from a height of 60 cm onto each of specimens which had been cut off into 60 mm and 100 mm thick respectively, 40 mm long and 40 mm wide, so that impacts were given to the specimens to develop strains therein. Using their residual strains (%) immediately after the development of strains, their impact resistance levels were judged in accordance with the following standard.

Residual strain (%)

| | |
|---|---|
| 35% or smaller | O |
| greater than 35% | X |

[7] After allowing each energy absorber to stand at 20° C. for 48 hours subsequent to its molding, the shrinkage factor of the energy absorber was calculated in relation to the longitudinal inner dimension of the metal mold. Its dimensional stability was judged in accordance with the following standard.

Shrinkage factor

| | |
|---|---|
| smaller than 1.5% | O |
| 1.5% (inclusive) - 3% (exclusive) | Δ |
| 3% or greater | X |

Having now fully described the invention, it will be apparent to one of ordinary skill in the art that many changes and modifications can be made thereto without departing from the spirit or scope of the invention as set forth therein.

We claim:

1. An energy absorber comprising an expansion-molded article of prefoamed particles which use, as the base resin thereof, a resin obtained by impregnating high-density polyethylene with an aromatic vinyl monomer and polymerizing the monomer, said absorber having a density ($\rho$) of 0.015–0.15 g/cm$^3$ and satisfying the following relation:

$$E_{20}/\rho \geq 45 \text{ kg·cm/g}$$

wherein $E_{20}$ (kg·cm/cm$^3$) means the quantity of energy absorbed upon 70% compression at 20° C. and $\rho$ has the same meaning as defined above.

2. An energy absorber according to claim 1, wherein the content of the aromatic vinyl monomer amounts to 10–60 wt. % of the whole expansion-molded article.

3. An energy absorber according to claim 1 wherein the high-density polyethylene has a density of from 0.94–0.97 g/gm$^3$.

4. An energy absorber according to claim 1 wherein the high-density polyethylene has a density of 0.955–0.97 g/cm$^3$.

5. An energy absorber according to claim 1 wherein said absorber has a density ($\rho$) of 0.02–0.1 g/cm$^3$.

* * * * *